US012726668B2

(12) United States Patent
Baughman et al.

(10) Patent No.: US 12,726,668 B2
(45) Date of Patent: Sep. 1, 2026

(54) PERSONALIZED VIDEO STREAM WITH DIFFUSIBLE FEATURES FROM OTHER VIDEO STREAMS

(71) Applicant: International Business Machines Corporation, Armonk, NY (US)

(72) Inventors: Aaron Keith Baughman, Cary, NC (US); Chandankumar Johakhim Patel, Fairborn, OH (US); Eduardo Morales, Key Biscayne, FL (US); Rahul Agarwal, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 19/009,721

(22) Filed: Jan. 3, 2025

(65) Prior Publication Data

US 2026/0197513 A1 Jul. 9, 2026

(51) Int. Cl.
*H04N 21/258* (2011.01)
*G06V 10/44* (2022.01)
*H04N 21/25* (2011.01)

(52) U.S. Cl.
CPC ....... *H04N 21/25891* (2013.01); *G06V 10/44* (2022.01); *H04N 21/251* (2013.01); *G06V 2201/07* (2022.01)

(58) Field of Classification Search
CPC . H04N 21/25891; H04N 21/251; G06V 10/44
See application file for complete search history.

(56) References Cited

U.S. PATENT DOCUMENTS

| | | | | |
|---|---|---|---|---|
| 8,913,835 | B2 | 12/2014 | Kumar et al. | |
| 8,949,235 | B2 | 2/2015 | Peleg et al. | |
| 10,032,113 | B2 | 7/2018 | Codella et al. | |
| 10,074,013 | B2 | 9/2018 | Newman et al. | |
| 10,970,554 | B2 | 4/2021 | Oz et al. | |
| 11,896,847 | B2 | 2/2024 | Hibbard | |
| 2002/0157116 | A1 | 10/2002 | Jasinschi | |
| 2015/0020119 | A1 * | 1/2015 | Kim | H04N 21/482 725/59 |

(Continued)

OTHER PUBLICATIONS

"Fine tuning vs Prompt Engineering: What's the difference?", Datascientest, Mar. 19, 2024, 5 pages.

(Continued)

*Primary Examiner* — Mulugeta Mengesha
(74) *Attorney, Agent, or Firm* — James L. Olsen

(57) ABSTRACT

A method, according to one embodiment, includes receiving a plurality of video streams, performing feature identification to identify objects within scenes of the plurality of video streams, and correlating the identified objects with event outcomes within the video streams. The method further includes selecting a first of the video streams with a relatively highest level of correlation to the event outcomes, diffusing features from a remainder of the video streams into the first video stream to generate a personalized video stream, and causing the personalized video stream to be transmitted to a user device used by a target user. A computer program product, according to one embodiment, includes one or more computer readable storage media, and program instructions stored on the one or more storage media to perform the foregoing method.

20 Claims, 2 Drawing Sheets

(56) References Cited

U.S. PATENT DOCUMENTS

| | | | | |
|---|---|---|---|---|
| 2017/0068992 A1* | 3/2017 | Chen | H04L 65/61 |
| 2021/0308487 A1 | 10/2021 | Hibbard | |
| 2022/0318956 A1 | 10/2022 | Xu | |
| 2023/0140125 A1 | 5/2023 | Glesinger et al. | |
| 2023/0267736 A1* | 8/2023 | Green | G06V 20/47 382/103 |
| 2024/0185498 A1* | 6/2024 | Francis | G06T 15/00 |
| 2025/0078336 A1* | 3/2025 | Westcott | G06T 11/00 |
| 2025/0104290 A1* | 3/2025 | Ding | G06V 10/44 |
| 2025/0267315 A1* | 8/2025 | Maalej | H04N 21/812 |

OTHER PUBLICATIONS

"Generative adversarial network", Wikipedia, retrieved from web https://en.wikipedia.org/wiki/Generative_adversarial_network, dated Mar. 5, 2025, 31 pages.

"Knowledge distillation", Wikipedia, retrieved from web https://en.wikipedia.org/wiki/Knowledge_distillation, dated Mar. 5, 2025, 6 pages.

"Transformer (deep learning architecture)", Wikipedia, retrieved from web https://en.wikipedia.org/wiki/Transformer (deep_learning_architecture), dated Mar. 5, 2025, 31 pages.

"Variational autoencoder", Wikipedia, retrieved from web https://en.wikipedia.org/wiki/Variational_autoencoder, dated Mar. 5, 2025, 9 pages.

Bird et al., "Typology of Risks of Generative Text-to-Image Models", AIES '23, Aug. 8-10, 2023, 15 pages.

Cai et al., "DesignAID: Using Generative AI and Semantic Diversity for Design Inspiration", CI '23, Nov. 6-9, 2023, pp. 1-11.

Croitoru et al., "Diffusion Models in Vision: A Survey", arXiv:2209.04747, Jan. 16, 2025, 25 pages.

Issa Ali. "Transformer, GPT-3,GPT-J, T5 and BERT", Medium, Jan. 26, 2023, 19 pages.

Kahatapitiya et al., "Object-Centric Diffusion for Efficient Video Editing", arXiv:2401.05735v3, Aug. 30, 2024, 31 pages.

Kanungo et al., "An efficient k-means clustering algorithm: analysis and implementation", IEEE Transactions on Pattern Analysis and Machine Intelligence, Jul. 2002, pp. 881-892.

Karras et al., "Elucidating the Design Space of Diffusion-Based Generative Models", NeurIPS Proceedings, 2022, 13 pages.

Universität Heidelberg "A Unified Architecture for Instance and Semantic Segmentation" http://presentations.cocodataset.org/COCO17-Stuff-FAIR.pdf, 2017, 48 pages.

Wu et al., "Promptus: Can Prompts Streaming Replace Video Streaming with Stable Diffusion", arXiv:2405.20032v1, May 30, 2024, 15 pages.

Xu et al., "Versatile Diffusion: Text, Images and Variations All in One Diffusion Model", Proceedings of the IEEE/CVF International Conference on Computer Vision (ICCV), 2023, pp. 7754-7765.

Zhang et al., "Text-to-image Diffusion Models in Generative AI: A Survey", arXiv:2303.07909v3, Nov. 8, 2024, 40 pages.

* cited by examiner

PERSONALIZED VIDEO STREAM WITH DIFFUSIBLE FEATURES FROM OTHER VIDEO STREAMS

BACKGROUND

The present invention relates to artificial intelligence (AI), and more specifically, this invention relates to video streams.

A video typically is a stream of consecutive pictures. The pictures are played by user devices at a predetermined rate. These devices may access video content locally in some use cases. In some other use cases, the video content is additionally and/or alternatively delivered to the user device in a video stream that the devices access over a network connection. Services, such as cable providers, provide a plurality of video streams to user devices that users of the user devices are able to selectively navigate between.

SUMMARY

A method, according to one embodiment, includes receiving a plurality of video streams, performing feature identification to identify objects within scenes of the plurality of video streams, and correlating the identified objects with event outcomes within the video streams. The method further includes selecting a first of the video streams with a relatively highest level of correlation to the event outcomes, diffusing features from a remainder of the video streams into the first video stream to generate a personalized video stream, and causing the personalized video stream to be transmitted to a user device used by a target user.

A computer program product, according to one embodiment, includes one or more computer readable storage media, and program instructions stored on the one or more storage media to perform the foregoing method.

A computer system, according to another embodiment, includes a processor set, one or more computer readable storage media, and program instructions stored on the one or more storage media to cause the processor set to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
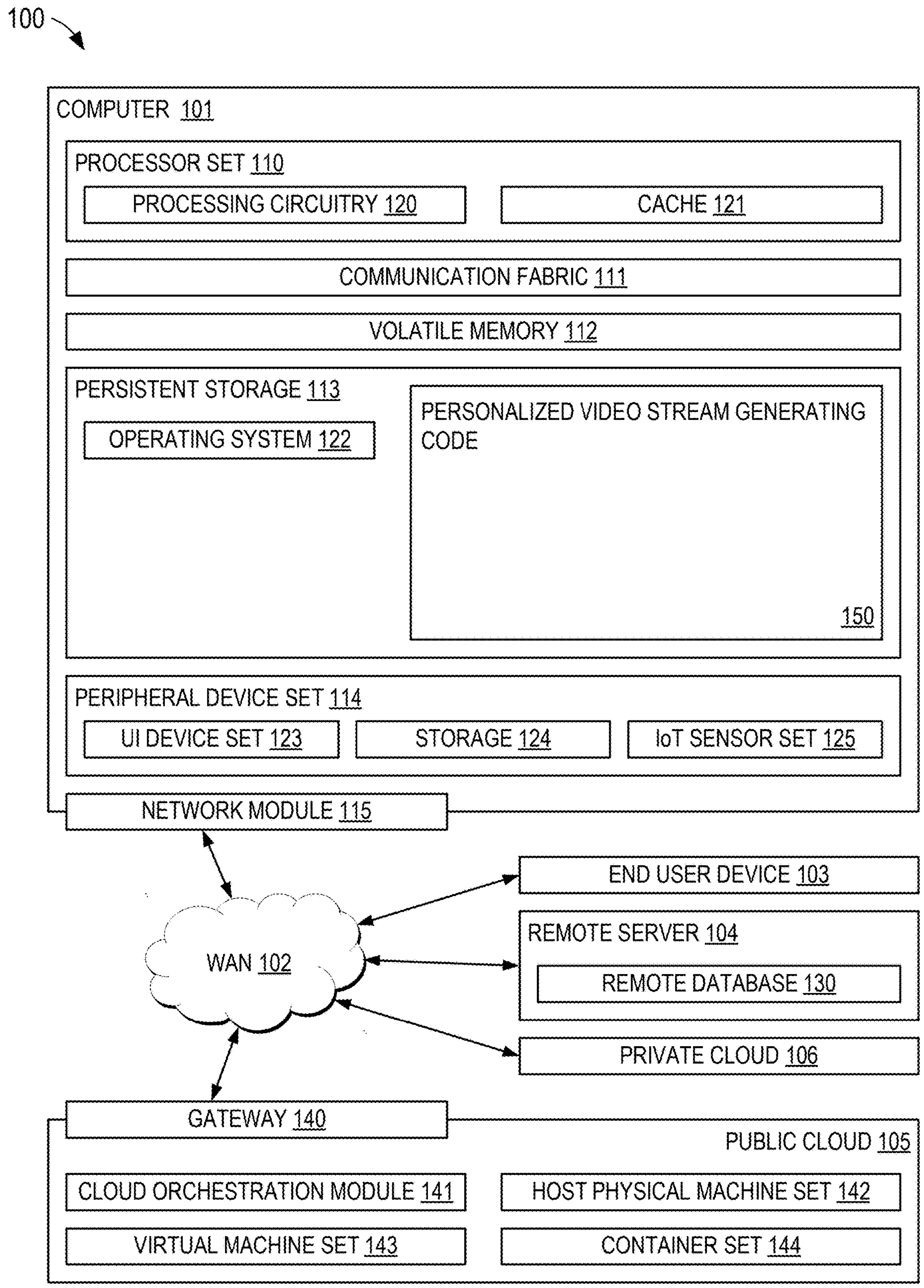
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the"

include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for generating a personalized video stream with diffusible features from other video streams.

In one general embodiment, a method includes receiving a plurality of video streams, performing feature identification to identify objects within scenes of the plurality of video streams, and correlating the identified objects with event outcomes within the video streams. The method further includes selecting a first of the video streams with a relatively highest level of correlation to the event outcomes, diffusing features from a remainder of the video streams into the first video stream to generate a personalized video stream, and causing the personalized video stream to be transmitted to a user device used by a target user.

In another general embodiment, a computer program product includes one or more computer readable storage media, and program instructions stored on the one or more storage media to perform the foregoing method.

In another general embodiment, a computer system includes a processor set, one or more computer readable storage media, and program instructions stored on the one or more storage media to cause the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as personalized video stream generating code of block 150 for generating a personalized video stream with diffusible features from other video streams. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located “off chip.” In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere herein, a video typically is a stream of consecutive pictures. The pictures are played by user devices at a predetermined rate. These devices may access video content locally in some use cases. In some other use cases, the video content is additionally and/or alternatively delivered to the user device in a video stream that the devices access over a network connection. Services, such as cable providers, provide a plurality of video streams to user devices that users of the user devices are able to selectively navigate between.

In some other use cases, users may be presented with multiple selectable choices when they select what streaming channel, video, or linear programming content to watch. The opportunity cost of picking one content stream over another content stream trades off the chance of missing interesting content. This is particularly challenging when multiple live events are happening such as national sports games, international sports tournaments, simultaneous shows, etc. The majority of users typically make an educated guess at what content they will enjoy by picking content streams that interests them at the current time without regard to other content. Thereafter modifying content based on these selections involves a complicated manual process. At other times, users may not be aware of the fact that other content streams are available to watch. Furthermore, use of multiple display screens is not a solution to this problem, as this can overwhelm users who are then not able to focus on a specific piece of content.

In sharp contrast to the deficiencies described above, in order to prevent a user from being overwhelmed, confused, and dissatisfied with content streams, the techniques of embodiments and approaches described herein include changing the images and/or objects within a base image or stream of images to create a personalized video stream that is tailored for a specific target user. In order to create such a personalized video stream, diffusible identification of objects may be performed across multiple video streams, and correlation and causation relationships may be determined between objects across multiple streams. Prompts based on diffusible identification, correlation, and causation of objects may be generated, and sequential ordering of nested generative content based on correlation and causation may be performed.

Figure 2:
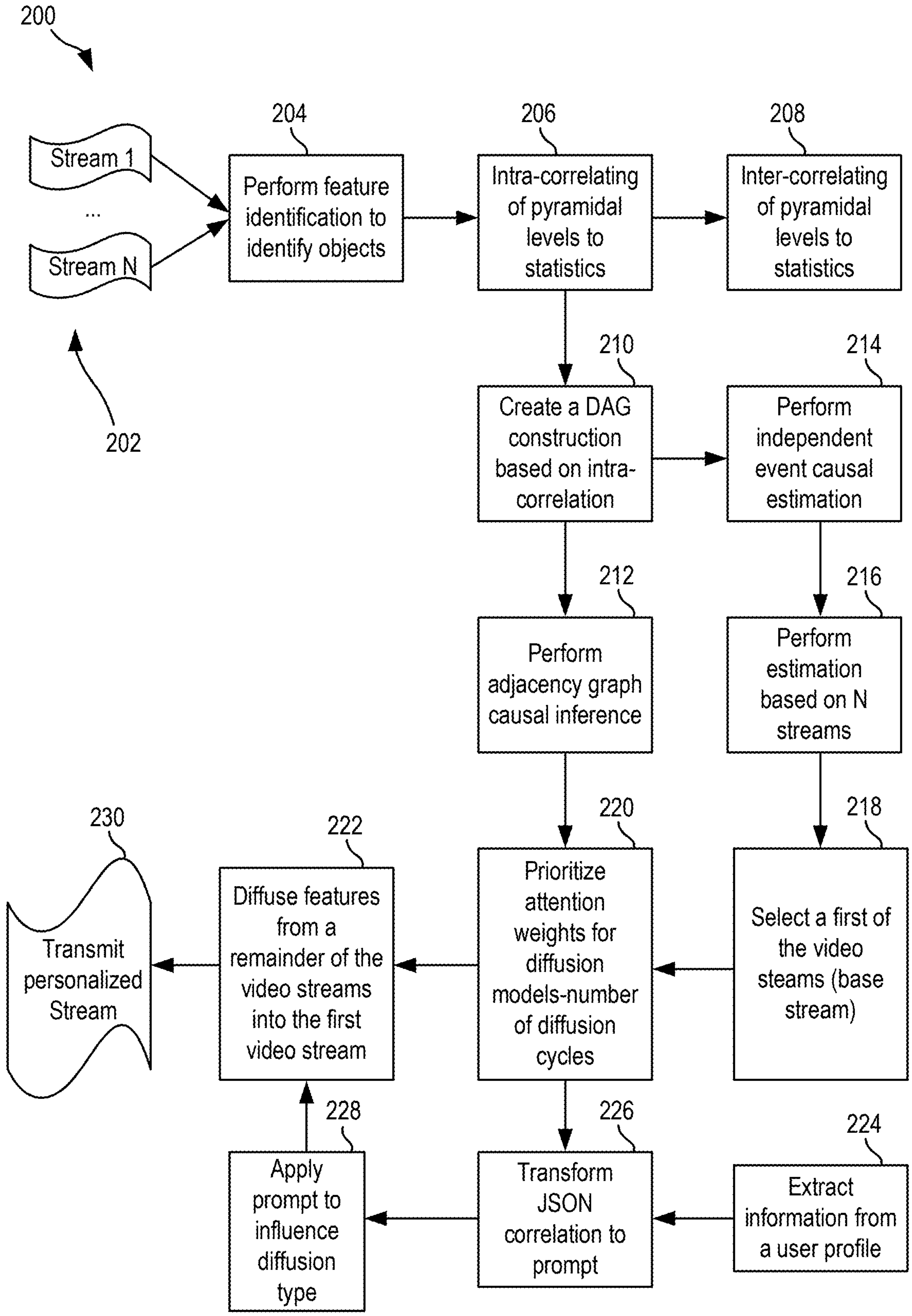
FIG. 2 is a flowchart of a method, in accordance with one embodiment of the present invention.

Now referring to FIG. 2, a flowchart of a method 200 is shown according to one embodiment. The method 200 may be performed in accordance with aspects of the present invention in any of the environments depicted in FIGS. 1-2, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

Operation 202 includes receiving and/or obtaining access to a plurality of video streams, e.g., see Stream 1, . . . , Stream N. The video streams may include any number of video streams; however, the video streams preferably include at least two video streams, and in some further preferred approaches, include more than three video streams. In some approaches, at least some of the video streams are live video streams, e.g., broadcasts of live sports events, broadcasts of live news broadcasts, etc. In some other approaches, at least some of the video streams are additionally and/or alternatively recorded events and/or media, e.g., episodes of television shows, etc. The video streams may, in some approaches, be received from a database and/or streaming provider, e.g., a network provider, a streaming service, etc. In contrast, in some other approaches, one or more of the video streams may be obtained, e.g., fetched, accessed, requested, etc., from a predetermined database.

Feature identification is, in some approaches, performed to identify objects within scenes of the plurality of video streams, e.g., see operation 204. Feature identification techniques that would become apparent to one or ordinary skill in the art after reading the descriptions herein may be used. In some approaches, the performed feature identification is feature pyramidal identification, where the feature pyramidal identification is based on a narrowing of features windows to identify the identified objects within frames that the scenes of the plurality of video streams are made up of.

In some approaches, the objects are humans. In some other approaches, the objects are animals. In some other approaches, the objects are sports equipment, e.g., helmets, jerseys, a ball, etc. The objects may additionally and/or alternatively be an object of interest, e.g., a relatively most captured object within the frames. The objects may additionally and/or alternatively be an object moving at a relatively fastest speed as compared to other objects.

The identified objects are correlated with event outcomes identified within the video streams, e.g., see operation 206 and operation 208. For context, in some approaches, the event outcomes may be potential outcomes of a topic that the video stream is based on. For example, for sports related video streams, the event outcomes may include one or more of, e.g., winning a point, game, set, or match.

In some approaches, the event outcomes are identified using techniques that would become apparent to one or ordinary skill in the art after reading the descriptions herein. In some approaches, the event outcome(s) of a given one of the video streams are determined by causing, e.g., instructing, a trained AI model to determine, based on historical portions of the given video stream and/or other video stream(s) determined to have at least a predetermined threshold degree of similarity with the given video stream, event outcomes.

The identified objects are, in some approaches, correlated with one or more determined outcomes of the scene. In some approaches, each identified object is, in some approaches, correlated with a determined outcome of the scene. In one example, assuming that a first of the identified objects includes a ball used for playing a sport, a determined event outcome (that the ball is correlated with) may be use of the ball by a team athlete to score a point.

The correlating is, in some approaches, based on directed acyclic graph structures. Accordingly, method 200, in some approaches, includes building directed acyclic graph structures based on the determined outcomes and the identified objectives. These graph structures may be built using techniques that would become apparent to one of ordinary skill in the art after reading the descriptions herein.

Positive and negative game play correlations are broad definitions that can then be correlated across sports or events. A first type of causality measure is, in some approaches, obtained using inter-correlation and/or intra-correlation. For example, in some of such approaches, inter-correlation is performed across different types of events to provide a first correlation measure, e.g., see operation 208. Within intra-correlation (which provides a second correlation measure), e.g., see operation 206, a Directed Acyclic Graph (DAG) may be constructed to create adjacency matrices. For example, operation 210 includes creating a DAG based on the identified objects and the event outcomes identified within the video streams, where the adjacency matrices are based on the DAG. In some approaches, the DAGs provide a second measure of causality, e.g., where the adjacency matrices create relation between different frames of the video stream that include a given one of the identified object and frames of the video stream that a given one of the event outcomes is based on. In some other approaches, the adjacency matrices are additionally and/or alternatively used to create relation between different frames of the video stream that include one or more of the event outcomes, e.g., to determine a first frame and a last frame of the event.

The correlating may, in some approaches, additionally and/or alternatively be based on adjacency matrices across events associated with the event outcomes (that the event outcomes are based on). For example, method 200 may, in some approaches, include using the DAGs to perform adjacency graph causal inferencing, e.g., see operation 212. A third measure of causality is thereby able to be gathered from the similarity between adjacency matrices across different events that the event outcomes are based on.

Independent event causal estimation techniques of a type that would become apparent to one of ordinary skill in the art may additionally and/or alternativity be performed, based on the DAGs, to provide further measures of causality, e.g., see operation 214. This causal estimation may additionally and/or alternatively be performed with respect to all of the video streams, e.g., see N steams in operation 216.

In summary, in some approaches, the three causality measures mentioned above help to order and cluster different objects together. These causality measures include a first causality measure that includes correlations between variables, e.g., also referred to herein as "identified objects," and outcomes across events, a second causality measure that includes the creation of DAGs, and a third causality measure that includes a similarity of adjacency matrices.

The video stream having the highest level of correlation to the event outcomes is determined using at least some of the causality measures described above and is selected as the base stream. Accordingly, method 200, in some approaches, includes determining and selecting a first of the video streams with a determined relatively highest level of correlation to the event outcomes, e.g., see operation 218. For context, the base stream (also referred to as the selected first video stream) may be defined as one of the video streams that is selected to use as a base for a personalized video stream that is generated. In other words, at least some, and preferably a majority of the contents of the selected first video stream are incorporated, e.g., used, into the personalized video stream.

Additional content may then be added to the selected first video stream to generate the personalized video stream. For example, in some preferred approaches, method 200 includes diffusing features from a remainder of the video streams of the plurality of video streams (e.g., the video streams other than the selected first video stream) into the first video stream to generate the personalized video stream, e.g., see operation 222. In some approaches, stable diffusion may be used to perform the diffusion described herein. For context, stable diffusion may be performed by instructing a generative AI model that can produce unique photorealistic images from text and image prompts. Stable diffusion, in some approaches, generates outputs by progressively adding noise to a set of random vectors. In doing so, a deep learning method called latent diffusion may be used.

For context, a feature that is diffused from a remainder of the video streams may include an object in some approaches. In some other approaches, a feature may additionally and/or alternatively include other portions of a video stream, e.g., audio, added special effects, closed captioning, etc. In some approaches, the other streams provide objects that can be diffused into the base image of the first video stream. However, diffusion epochs used to perform the diffusion may, in some approaches, be determined by determined causal strength. Accordingly, in some approaches, the diffusing may be based on a causal strength associated with the features. This causal strength may be determined by the causality measures described above and provide a sequential aspect of diffusion that can change over time as changes occur in scenes of the video streams, e.g., games change within a sports-based video stream.

In some approaches, weightages may be applied to the diffusion of the features. For example, some types of features with at least a predetermined degree of similarity with objects within scenes of the selected first video stream may be prioritized by a relatively greater weight being assigned to the features. During the diffusion, relatively greater weights (attention weights) are caused to be prioritized by diffusion models (e.g., a trained artificial intelligence (AI) model instructed to perform image diffusion) used in one or more diffusion cycles performed for diffusing the features of the remainder of the video streams, e.g., see operation 220.

The diffusing of operation 222, in some approaches, is based on prompts to alter the features that are diffused from the remainder of the video streams into the first video stream. In some approaches, the prompts include text prompts. Text prompts may, depending on the approach, include subjects that the features are to be based on, e.g., the type of artwork, a description of the subject, the level of details required, specificity and style, composition and lighting effects, etc. The prompts may additionally and/or alternatively include an image prompt. An image prompt may be applied to affect the way that an output image is produced by allowing an image to be used as an image prompt. Image prompt enables a given image (of a video stream) to be used as part of the prompt so that an output image's composition, coloring, style etc. can be based on the input image prompt. In other words, an image prompt influences a model via conditioning, and specifications of the prompt may be used to alter the original state of the features of the video streams that are used to generate the personalized video stream.

In order to personalize the prompts for a target user of the personalized video stream, method 200, in some approaches, includes extracting, from a user profile of the target user, information about preferences of the target user, e.g., see operation 224. In other approaches, the target user may be determined, e.g., based on login information entered into the target user by the target user, based on a video application on the target device having the target user's profile active or selected, etc. It should be noted that, in preferred approaches, user information of the target user is only used subsequent to gaining expressed permission from the user, e.g., an opt-in. This user information may include, e.g., past viewing history of the target user, selections made by the first user, eye focus information collected for the first user (with respect to types of content that the target user's eye(s) focus on), etc.

The information about the preferences of the target user are caused to be analyzed by a trained AI model. For example, in some approaches, the trained AI model may be instructed to consume and analyze the information about the preferences of the target user, where an output of the trained AI model includes the prompts. In some approaches, the trained AI model is caused, e.g., instructed, to transform from a text-based format, e.g., JavaScript Object Notation (JSON) to another predetermined text format of a type that would become apparent to one of ordinary skill in the art after reading the descriptions herein, e.g., see operation 226.

In one approach, an input into the diffusion model may include prompts that are in a text-based format, e.g., such as the predetermined text format mentioned above. A user profile and/or causality structure(s) may be input into a decoder large language model (LLM) to determine the prompt(s). For example, the LLM may be caused, e.g., be instructed, to use the inputs to produce a diffusion level prompt to influence the way the selected first video stream is altered at a macro level. For example, the background color and/or color tones of the selected first video stream may be slightly changed (e.g., by a predetermined degree) by the prompt while individual segments of the selected first video stream may be altered by diffusion. In one or more of such approaches, an output of an AI model that uses the output of the LLM includes an altered selected first video stream (also referred to herein as the "personalized video stream"). This AI model may be caused, e.g., instructed, to apply the prompt to influence the diffusion type, e.g., see operation 228.

In some approaches, behavior of the features of the remainder of the video streams that are diffused into the selected first video stream to generate the personalized video stream are modified to reflect a scene that the objects of the selected first video stream are behaving in. For example, assuming that the diffused features include first sports players and the objects of the selected first video stream include second sports players, the first sports players may be portrayed playing a sport with the second sports players, e.g., the first sports players may guard the second sports players on a sports court. In some approaches, this may cause fictional content to be created based on non-fictional events (e.g., fictitious live events to be portrayed in a generated video stream based on at least some non-fictitious live events in the video streams). In some other approaches, the diffused features may be cast into portion(s) of the selected first video stream that do not include objects that are related to the event outcomes. For example, assuming that the diffused features include first sports players and a scoreboard within the selected first video stream is not related to an event outcome within the selected first video stream, the first sports players may be shown playing on the scoreboard (e.g., the scoreboard within the personalized video stream may be at least temporarily transformed to a display showing the first sports players).

The personalized video stream is, in some approaches, caused to be transmitted to a user device used by the target user, e.g., see operation 230.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a plurality of video streams;
performing feature identification to identify objects within scenes of the plurality of video streams;
correlating the identified objects with event outcomes within the video streams;
selecting a first of the video streams with a relatively highest level of correlation to the event outcomes;
diffusing features from a remainder of the video streams into the first video stream to generate a personalized video stream; and
causing the personalized video stream to be transmitted to a user device used by a target user.

2. The method of claim 1, wherein the correlating is based on directed acyclic graph structures.

3. The method of claim 1, wherein the correlating is based on adjacency matrices across events associated with the event outcomes.

4. The method of claim 3, further comprising:
creating a Directed Acyclic Graph (DAG) based on the identified objects and the event outcomes identified within the video streams, wherein the adjacency matrices are based on the DAG.

5. The method of claim 1, wherein the diffusing is based on a causal strength associated with the features.

6. The method of claim 1, wherein the diffusing is based on prompts to alter the features that are diffused from the remainder of the video streams into the first video stream.

7. The method of claim 6, further comprising:
extracting, from a user profile of the target user, information about preferences of the target user; and
causing the information to be analyzed by a trained artificial intelligence (AI) model, wherein an output of the trained AI model includes the prompts.

8. The method of claim 1, wherein the performed feature identification is feature pyramidal identification, wherein the feature pyramidal identification is based on a narrowing of features windows to identify the identified objects within frames that the scenes of the plurality of video streams are made up of.

9. A computer program product comprising:
one or more computer readable storage media; and
program instructions stored on the one or more storage media to perform operations comprising:
receiving a plurality of video streams;
performing feature identification to identify objects within scenes of the plurality of video streams;
correlating the identified objects with event outcomes within the video streams;
selecting a first of the video streams with a relatively highest level of correlation to the event outcomes;
diffusing features from a remainder of the video streams into the first video stream to generate a personalized video stream; and
causing the personalized video stream to be transmitted to a user device used by a target user.

10. The computer program product of claim 9, wherein the correlating is based on directed acyclic graph structures.

11. The computer program product of claim 9, wherein the correlating is based on adjacency matrices across events associated with the event outcomes.

12. The computer program product of claim 11, wherein the operations further comprise:
creating a Directed Acyclic Graph (DAG) based on the identified objects and the event outcomes identified within the video streams, wherein the adjacency matrices are based on the DAG.

13. The computer program product of claim 9, wherein the diffusing is based on a causal strength associated with the features.

14. The computer program product of claim 9, wherein the diffusing is based on prompts to alter the features that are diffused from the remainder of the video streams into the first video stream.

15. The computer program product of claim 14, wherein the operations further comprise:
extracting, from a user profile of the target user, information about preferences of the target user; and
causing the information to be analyzed by a trained artificial intelligence (AI) model, wherein an output of the trained AI model includes the prompts.

16. The computer program product of claim 9, wherein the performed feature identification is feature pyramidal identification, wherein the feature pyramidal identification is based on a narrowing of features windows to identify the identified objects within frames that the scenes of the plurality of video streams are made up of.

17. A computer system comprising:
a processor set;
one or more computer readable storage media; and
program instructions stored on the one or more storage media to cause the processor set to perform operations comprising:
receiving a plurality of video streams;
performing feature identification to identify objects within scenes of the plurality of video streams;
correlating the identified objects with event outcomes within the video streams;
selecting a first of the video streams with a relatively highest level of correlation to the event outcomes;
diffusing features from a remainder of the video streams into the first video stream to generate a personalized video stream; and
causing the personalized video stream to be transmitted to a user device used by a target user.

18. The computer system of claim 17, wherein the correlating is based on directed acyclic graph structures.

19. The computer system of claim 17, wherein the correlating is based on adjacency matrices across events associated with the event outcomes.

20. The computer system of claim 17, wherein the diffusing is based on a causal strength associated with the features.

* * * * *